UNITED STATES PATENT OFFICE.

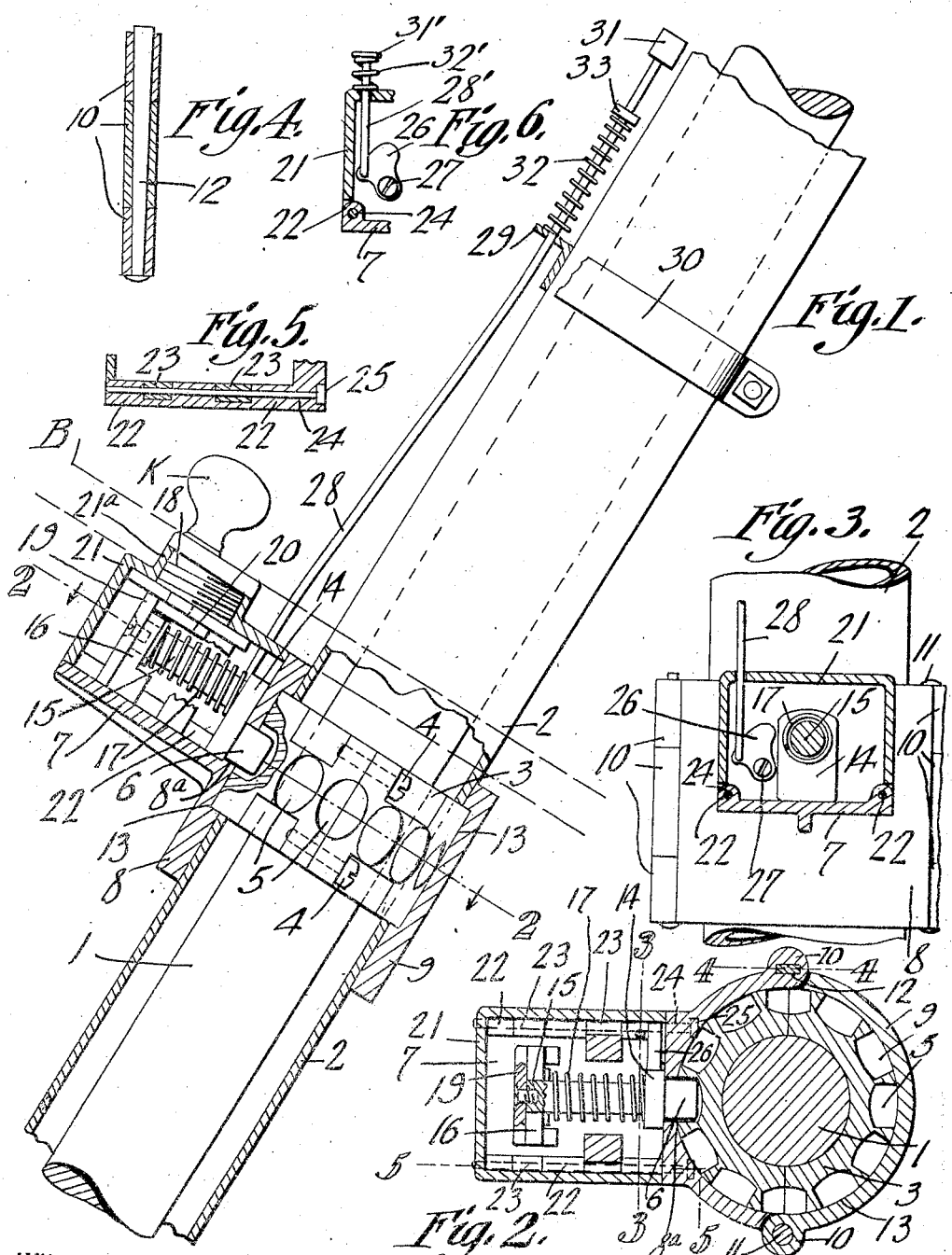

SAMUEL L. TERRY, OF CHICAGO, ILLINOIS.

AUTOMOBILE-LOCK.

1,206,944.  Specification of Letters Patent.  Patented Dec. 5, 1916.

Application filed March 2, 1916. Serial No. 81,700.

*To all whom it may concern:*

Be it known that I, SAMUEL L. TERRY, a citizen of the United States, residing at Chicago, in the county of Cook and State of Illinois, have invented a new and useful Automobile-Lock, of which the following is a specification.

The present invention appertains to automobile locks, and is an improvement over the locks disclosed in my co-pending applications, Serial Nos. 31,710 and 43,837 filed June 2, 1915, and August 15, 1915, respectively.

It is the object of the invention to provide a novel and improved device for locking the steering shaft of the steering gear of an automobile, although the device can be used for locking any suitable rotary or oscillatory part of a motor vehicle, to prevent the theft of the machine, the present device being readily installed, and serving its office in a thoroughly practical, reliable and efficacious manner.

It is also the object of the invention to provide an automobile lock which is semi-automatic in operation, since it is only necessary to move a finger piece or similar element, when leaving the car, to lock the steering shaft or kindred part of the machine, whereby the said shaft cannot be rotated for steering the machine, and which consequently prevents the use of the machine by an unwarranted person, but the steering shaft can be readily released by using a proper key.

The invention also includes a unique assemblage of the component elements, to prevent tampering with the working parts of the lock, they being concealed, so that access thereto cannot be had without destroying the lock, which would require some time and trouble, so as to prevent such action on the part of a maliciously inclined person, because this would enable the act to be detected.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a vertical section of the device as applied to the steering shaft and steering column, portions being shown in elevation. Fig. 2 is a section on the line 2—2 of Fig. 1. Fig. 3 is a section on the line 3—3 of Fig. 2. Fig. 4 is a section on the line 4—4 of Fig. 2. Fig. 5 is a section on the line 5—5 of Fig. 2. Fig. 6 is a sectional detail illustrating a modification.

The invention, as illustrated, is used for locking the steering shaft 1 which is rotatable within the tubular steering column or post 2, as usual, although it will be evident to those skilled in the art, that the device can be used for various purposes for locking a rotary or oscillatory part of an automobile or other machine, and to prevent the unwarranted operation thereof.

In carrying out the invention, a collar 3, which may be composed of two sections, is secured rigidly upon the shaft 1, the sections of said collar being secured together, as at 4, and said collar being fixed upon the shaft 1 in any suitable manner to prevent the relative rotation of said parts. The collar 3 is provided with an annular series of recesses or sockets 5, which may be elongated longitudinally of the shaft 1.

The recesses 5 are adapted for the reception of a latch bolt 6, and said recesses in being elongated, enables the latch bolt to enter said recesses even though the parts are shifted slightly relative to one another longitudinally of the shaft 1. This latch bolt 6 is carried by a bracket 7 outstanding from the section 8 of a clamp, said section 8 being of arcuate or semi-circular form and complementing a clamp section 9 of similar shape. The clamp section 8 has an aperture 8ª through which the bolt 6 is slidable. The arcuate clamp sections 8 and 9 fit and embrace the column 2, and are provided at their ends with alining butts 10. A pin 11 is inserted through one set of butts 10 and has its ends riveted, to hinge the sections 8 and 9 together, whereby they can be swung together and apart. A taper pin 12 is engaged through the other sets of butts 10 when the sections are applied to the column 2, and is driven tightly into place, to thereby cause the clamp to tightly embrace the column 2, and the smaller end of the pin 12 is then riveted, to prevent the withdrawal of the pin 12. The upper and lower edges of the sections 8 and 9 fit the column 2 tightly, and the clamp sections are provided between their edges and upon their inner sides with an annular channel 13 accommodating the collar 3. This also provides means for the proper assemblage of the collar 3 and clamp, in order to position the latch bolt 6 to enter the recesses 5. As illustrated, the column 2 is divided into two parts, between which the collar 3 is disposed, the clamp serving to rigidly connect the two sections of the column, but where conditions permit, the collar 3 can be attached upon the steering shaft 1 within the column, and the column instead of being provided with an annular opening, is provided with an opening or slot of restricted area for the passage of the latch bolt 6. Instead of using the pins 11 and 12 for attaching the ends of the clamp sections together, screws or other securing means can be used. The bracket 7 is integral with and projects from the clamp section 8 so as to be carried by the clamp.

The latch bolt 6, which is of stub form, is carried by a head 14 slidable upon the bracket 7 adjacent the clamp, and said head 14 has a shank or stem 15 slidable through an upstanding guide 16 carried by the bracket 7 adjacent its free end, whereby the latch bolt is guided for movement to and from the collar 3. A coiled wire expansion spring 17 is disposed between the guide 16 and head 14, tending to normally project the latch bolt 6 into engagement with the collar 3, whereby when the latch bolt is free to do so, it will automatically move into one of the recesses 5 to prevent the turning of the shaft 1.

The retraction of the latch bolt is accomplished by a key controlled device 18, operated by a suitable key K, a heel piece 19 being secured to the end of the shank or stem 15, and the device 18 including a cam 20 operated by the key K to move the heel piece 19 away from the shaft 1 to retract the latch bolt 6. The proper key K must therefore be used for retracting the latch bolt. A cap 21 having its bottom and one end open, is secured upon the bracket 7 to inclose the latch bolt and accompanying parts, and to form with said bracket, a casing or housing for the working parts. The key controlled device 18 is carried by the top of the cap 21, which may be provided with a collar 21ª for the reception of said device. The open end of the cap 21 fits the clamp section 8 to be closed thereby, and the rim of the cap 21 in seating upon the bracket 7 will close the bottom thereof.

In order to secure the cap 21 upon the flat bracket 7, the sides of the cap 21 are provided at their lower edges with apertured lugs 23 which fit between apertured lugs 22 with which the bracket 7 is provided adjacent its side edges, and pins 24 are insertible through said lugs, for attaching the cap and bracket together. The pins 24 are inserted from the inner side of the section 8, before the clamp is applied to the steering column, and after the section 8 is secured to the steering column, said pins 24 cannot be removed, for removing the cap 21. The inner ends of the pins 24 are preferably provided with heads 25 to prevent the outward movement of said pins. Instead of using the pins, however, screws or other securing means can be employed for attaching the cap and bracket 7 together.

As a means for holding the latch bolt 6 retracted during the use of the machine, a catch or detent 26 is pivoted, as at 27, to the clamp section 8, and is swingable in front of the head 14 when the latch bolt 6 is retracted, to thereby hold said latch bolt in such position. A rod 28 is pivotally connected to the detent 26 and passes slidably through an aperture in the top of the cap 21, and the rod 28 is slidable through the apertured ear 29 of a band 30 embracing the column 2, to guide said rod for vertical reciprocatory movement. The upper end of the rod has a finger piece 31, and a coiled wire expansion spring 32 is disposed around the rod between the ear 29 and a collar 33 secured upon the rod, whereby to move the rod upwardly to swing the detent 26 in front of the head 14 when the latch bolt is retracted. This rod 28 is used when the lock is disposed below the foot board B of the automobile, in order that the detent can be released conveniently from above the foot board, the device 18 being exposed through the foot board, for the insertion of the key K.

Fig. 6 illustrates how the rod 28' can be shortened, when the lock is used above the foot board, the rod 28' having a finger piece 31' immediately above the cap 21, and a coiled wire expansion spring 32' being disposed between the cap 21 and the finger piece 31' to raise the rod 28' when it is free to do so.

Ordinarily, when the machine is in operation, the latch bolt 6 is held in retracted position by the detent 26, and when the operator leaves the car, it is only necessary to press the rod 28, so that the detent 26 is moved away from the head 14, and this permits the spring 17 to come into play for projecting the latch bolt 6 into the registering recess 5. This will prevent the turning of the shaft 1, so that it is impossible for a person not possessing a proper key, to unlock the machine. The lock is automatic in nature, since the latch bolt is held in retracted position by the detent, and to lock the car, it is only necessary to move the detent, which releases the latch bolt and permits it to automatically engage the collar 3 for locking the machine. To unlock the machine, the key K is inserted into the device 18, and is turned to turn the cam 20, which will force the heel piece 19 away from the shaft 1 to retract the latch bolt 6, and as soon as said latch bolt is retracted, the detent 26 will swing in front of the head 14 to hold the latch bolt in retracted position, whereby it will not interfere with the ordinary operation of the machine.

Having thus described the invention, what is claimed as new is:—

1. A lock comprising a rotatable collar to be secured upon a steering shaft, a clamp to embrace a steering column and having an inner annular channel for receiving said collar, and a latch member movable through the clamp and engageable with the collar.

2. A lock comprising a clamp composed of sections, means for securing the sections together, one section having an outstanding bracket, a cap disposed on said bracket and having one end fitting said section, means for securing said cap and bracket together, said cap and bracket providing a casing, said bracket having a guide, a latch bolt slidable through said section and having a shank slidable through said guide, the latch bolt having a head, an expansion spring between said guide and head to project the latch bolt, a heel piece carried by the end of said shank, a detent pivoted to said section and swingable in front of said head to hold the latch bolt retracted, an operating member connected to said detent and projecting through the cap, and a key controlled device carried by the cap and having a cam engageable with the heel piece to retract the latch bolt.

3. A lock comprising a clamp composed of sections, one section having an outstanding bracket, a cap upon said bracket and having one end adjacent said section, said bracket and cap having apertured portions, pins inserted in said portions to secure the cap and bracket together, said pins being slidable through and being removable from the inner side of said clamp section, the cap and bracket providing a casing, a latch bolt within the casing slidable through said clamp section, and means for controlling the latch bolt.

In testimony that I claim the foregoing as my own, I have hereto affixed my signature in the presence of two witnesses.

SAML. L. TERRY.

Witnesses:
 CHARLES A. BILLINGS,
 JOHN T. BALL.